(12) United States Patent
Roslak et al.

(10) Patent No.: US 8,226,012 B2
(45) Date of Patent: Jul. 24, 2012

(54) AD-HOC WIRELESS COMMUNICATION NETWORK USING PRICE CHECKING STATIONS

(75) Inventors: Thomas K. Roslak, Northport, NY (US); Luis F. Llamas Martinez Garza, Manorville, NY (US); Patrick S. Riechel, Cambridge, MA (US)

(73) Assignee: Symbol Technologies, Inc., Holtsville, NY (US)

( * ) Notice: Subject to any disclaimer, the term of this patent is extended or adjusted under 35 U.S.C. 154(b) by 162 days.

(21) Appl. No.: 12/823,763

(22) Filed: Jun. 25, 2010

(65) Prior Publication Data

US 2011/0320379 A1 Dec. 29, 2011

(51) Int. Cl.
*G06K 7/10* (2006.01)
(52) U.S. Cl. .................... 235/472.02; 235/385
(58) Field of Classification Search .......... 235/472.02, 235/462.45, 383, 385
See application file for complete search history.

(56) References Cited

U.S. PATENT DOCUMENTS

| | | | |
|---|---|---|---|
| 5,773,954 A * | 6/1998 | VanHorn | 320/137 |
| 6,253,082 B1 | 6/2001 | Hegeveld | |
| 6,367,694 B1 * | 4/2002 | Roslak | 235/380 |
| 6,510,989 B1 | 1/2003 | Ortega | |
| 6,574,549 B2 * | 6/2003 | Cato et al. | 701/533 |
| 6,595,417 B2 * | 7/2003 | O'Hagan et al. | 235/383 |
| 7,233,792 B2 | 6/2007 | Chang | |
| 7,254,615 B2 | 8/2007 | Taib et al. | |
| 2006/0003785 A1 | 1/2006 | Zatezalo | |
| 2008/0070495 A1 | 3/2008 | Stricklen et al. | |
| 2008/0086509 A1 | 4/2008 | Wallace | |
| 2008/0130604 A1 | 6/2008 | Boyd | |
| 2008/0237339 A1 * | 10/2008 | Stawar et al. | 235/383 |

* cited by examiner

*Primary Examiner* — Daniel StCyr
(74) *Attorney, Agent, or Firm* — Brian M. Mancini

(57) ABSTRACT

A technique for operating an ad-hoc wireless communication network includes providing 400 a plurality of price checking stations 102 having wireless communication capabilities, designating 402 one of the price checking stations 102 as a master station in the ad-hoc network, and designating the remaining stations as slave stations 100, and communicating with devices 104-110 deployed in the network using the wireless communications capabilities of the price checking stations 100, 102.

11 Claims, 4 Drawing Sheets

AD-HOC WIRELESS COMMUNICATION NETWORK USING PRICE CHECKING STATIONS

FIELD OF THE DISCLOSURE

The present invention relates generally to price checking stations and more particularly to an ad-hoc wireless communication network using price checking stations.

BACKGROUND

At present, many retail establishments utilize fixed price checking stations that are distributed through the establishment. The price checker stations are typically situated in fixed locations throughout the establishment, and are connected to a central computer or server that can provide information to a user of the stations. For example, a price checking station in a retail store can allow a customer to scan the barcode of an item to determine information about the item, including its cost. In addition, customers can check inventory, check the balance on a gift card, lookup a loyalty point balance, determine the location of a product call for assistance, print out recipes, gift registries and coupons for in-store specials as well as personalized coupons based on a scan of the customer's loyalty card.

Some price checking stations have a sophisticated communication processor with the ability to be connected to a central computer or server using wired (Ethernet) or wireless local area network (WLAN) or wireless wide area network (WWAN) connectivity. In particular, some price checking stations are operable in a Wi-Fi (IEEE 802.11a/b/g) communication network. However, an issue with these sophisticated price checker stations is that they are typically idle most of the time, which wastes their processing and communication capabilities.

Accordingly, there is a need to improve the utilization of price checking stations without incurring additional hardware costs.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
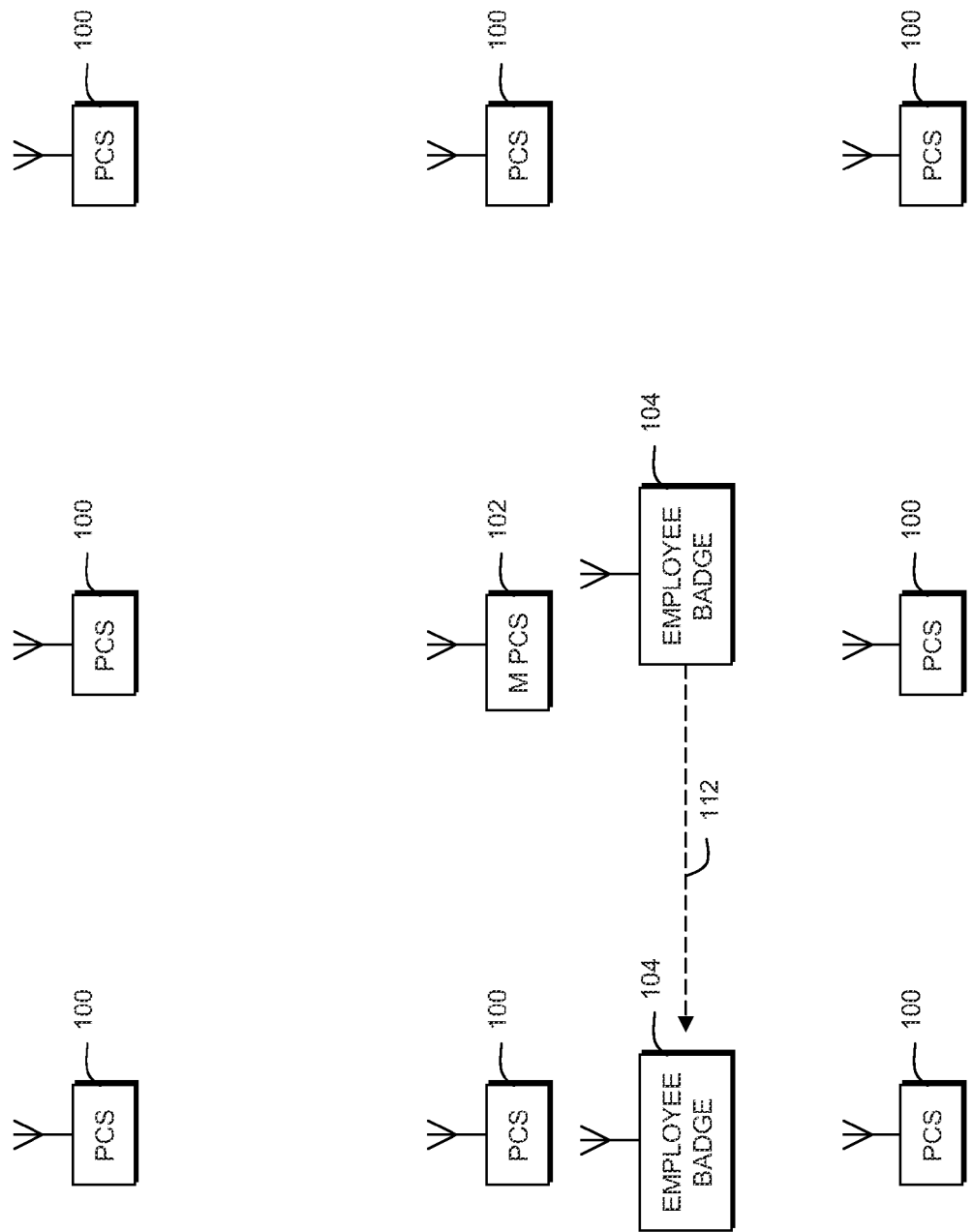
FIG. 1 is a simplified block diagram of an ad-hoc communication network system, in accordance with one embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The present invention improves the utilization of price checking stations without incurring added hardware costs. In particular, the present invention uses the wireless communication capability of the price checking stations to perform other valuable services for a store owner that are not normally related to price checking stations.

Price checker stations presently exist that are fully capable mobile computers that spend most of their lives idle. Accordingly, these stations have bandwidth, processing and security features that are underutilized. Current methods of managing a mobile workforce and their technology require additional hardware to act as a server or at best be loaded on another computing platform where the original services might be impacted by the addition of a management application. This additional hardware generally would consist of a single server, which would be a point of failure with no backup. The present invention addresses these issues by using existing price checking stations in an ad-hoc network environment, as described herein. Further, mobile computers and mobile computing assets are at risk of being lost or abused. The present invention addresses this issue by making specific employees responsible for specific hardware by associating employees to specific hardware in the ad-hoc network.

Referring to FIG. 1, the price checking stations 100, 102 can be wirelessly connected in an ad-hoc communications network, wherein the price checking stations can be automatically added or removed from the network on an ad-hoc basis. It is envisioned that the wireless network could operate under any of an IEEE 802.11a/b/g communication protocol, which are known in the art. However, it should be recognized that the present invention could operate under many different communication systems, including WLAN and WWAN networks, Bluetooth™, and the like, as are known in the art.

In the present invention, the ad-hoc network includes a plurality of price checking stations 100, 102 having wireless communication capabilities. Each price checking station would include a processor that controls a scanner and a wireless transceiver operable on the network. The scanner can be a barcode scanner, RFID scanner, and the like, as are known in the art. The processor, scanner, and transceiver are configured to provide the various embodiments of the present invention as described herein. The network could also include other wireless and wired communication devices of various types, which are not shown for the sake of simplicity. In particular, the network shown is a homogeneous network of similar stations 100, 102 although it will be appreciated that a network of various different devices, a heterogeneous network, can of course also be formed.

A feature of the ad-hoc network is that it can be dynamic. As a result, the present invention provides a technique for managing such a dynamic network as a result of stations being added to, or removed from, the network (e.g. being switched on or off, respectively, losing power or signal strength, etc.). For example, within each network a single master (price checking) station 102 is designated, to which the remaining price checking stations 100 are slaved, the master station 102 can merely be determined as the station which initiates the network or that controls the network at any one time, and the master/slave relationship governs communication procedures. Typically, the master station is chosen by decision among all the stations 100, 102. The master station would be responsible for managing the information-gathering and administration processes of the ad-hoc network and continually update the slave units with the processed data. It is envisioned that the network of price checking stations would use a similar protocol as DHCP (Dynamic Host Configuration Protocol) for efficiency.

In another aspect, the ad-hoc network can allow access to a fixed network infrastructure, such as a fixed access point which can be a central computer or server of the establishment (not shown). For example, any member of the ad hoc network can access the fixed network through the master station 102. In this arrangement, the master station acts as a gateway for the other stations 100. Alternatively, the slave stations 100 can access the fixed network infrastructure directly. However, this could give rise to inefficiency and unnecessary duplication.

The master station designation is preferably carried out dynamically, based on a pre-selected network parameter such as signal strength. For example, the relative average received signal strength value for each station from the other stations 100 in the network can be used to designate the master station 102, where the master station 102 is the station having the highest signal strength value. Accordingly, the best placed station at any time could become the master station 102, and this is updated constantly to compensate for stations entering or leaving the ad-hoc network. Here the master station 102 is shown as nominally the most central device, physically, in the network, although as stressed above other factors may influence which devices are elected as the master station. Preferably, each time a slave station 100 communicates with the master station 102, it sends an updated network parameter value (e.g. signal strength) and, if this value exceeds the master station's value then the slave station is designated the master station, and the other slave stations 100 are so informed. An alternative to the previous approach would be to enable the slaves and master stations to provide a broadcast packet that provides up to date signal strength of other stations that this device measures during system operations. Thus the broadcast messages would provide information that can be evaluated by the master and other stations on the network. Information could be chosen to include such information as signal strength, traffic, processor demands and other factors such as interference.

It may be the case that the master station is busy performing its prime function of price checking, or perhaps the master station loses power. As a result, the master station can no longer manage the ad-hoc network. In this case, a new master station may be chosen by the remaining stations 100. In the scenario where the function of the master station 102 is occupied with price checking, there should be sufficient time before switching functions for the master station to inform the ad-hoc network that it will be leaving the network. In this scenario, the master station could appoint a new master station or the remaining stations could designate a new master station before the existing master station leaves the network. If there is insufficient time for the master station to inform the ad-hoc network of its leaving, the remaining stations 100 will learn of its disappearance in the normal course of network communications, and designate a new master station as previously described. For example, at a time when the master station stops communicating with the slave stations, indicating either that the master station's processor/WLAN is otherwise occupied or that the master station has otherwise become disabled, the slave stations would communicate to designate a new master to take over control of the ah-hoc network. This new master station, due to the prior updating, can start off where the original master stopped, thereby providing a failover mechanism. The advantage of this type of system is that there would be no single point of failure. Alternatively, an active master station my designate a second and third back up master based upon system performance and information that is collected through network operations. The back up masters will monitor the master station and will take over should the master station not respond within a predetermined time period. This allows for rapid succession of masters reducing decision making as alternate masters are already in place.

The master station 102 can store additional data relating to the network in addition to the standard device data held by any station in the network (including for example master or slave status-related data). This additional data can be stored in various fields, tables, or logs. This data can include values representative of the most relevant average received signal strength of identified stations 100, and other network function information, as will be detailed below. This data can be cached in a memory of the master station, which can optionally provide this data to all the slave stations in the network. Alternatively, the data can be cached in fixed network architecture such as a central server or computer that can communicate with the master station alone or with all stations. For example, the master station can provide an address of the central server for the slave stations 100 to use to retrieve data. If any station needs to access the cached data it can poll the master station with the relevant data reference (bearing in mind that the master station ID is stored at each device and dynamically updated). Once the request is received from a slave device to access the data, the master station can cause the data to be transferred to the requesting slave station via the master station, or the slave station can be instructed to retrieve the data itself from the central server.

In addition, the master station can maintain a time-out system such that if no signal is received from a given slave station within a predefined time period, then the slave station is deleted from the ad-hoc network. Alternatively, or in addition, the master station can monitor a power level required by the master station to receive signals from a slave station. A threshold power level can be determined, for example based on the system or communication protocol parameters, indicating that the slave station can no longer communicate in the ad-hoc network when its received power is less than the threshold. When this threshold is reached the master station will start a time-out period. If the receive power required remains below the threshold beyond the time-out period, then the slave station is considered as having left the network and its data is removed from the cache maintained at the master station. In an alternative embodiment, the slave signal strength is monitored by the master as well as other slaves. In a mesh configuration, the slave may be considered active as long as the link between a slave and the master can be bridged though the mesh. It may be of practical mathematical importance to establish the lowest signal that is allowed to maintain a level of operation and availability. If the signal falls below this level and the information from a slave cannot be routed reliably through the mesh network, the master will determine that the slave is no longer available in the ad hoc network. The slave may rejoin the network when the slave or master is able to connect the device through the mesh network.

Referring back to FIG. 1, in its simplest embodiment, the present invention can use any one or more of the price checking stations of the ad-hoc network to track employee time and attendance. For example, an employee could be issued a badge 104 that can include a unique barcode or Radio Frequency Identification (RFID) tag. Any price check station could be used to scan/read the employee badge 104 and report this information to the master price checking station 102 or central server (not shown) which can record the information. Further, the ad-hoc network could be used to track the presence or location of the employee (badge) as they move 112 within the area of the network in proximity to any price checking station 100, 102 assuming that a price check station has a proximal reading capability, such as with an RFID reader.

Figure 2:
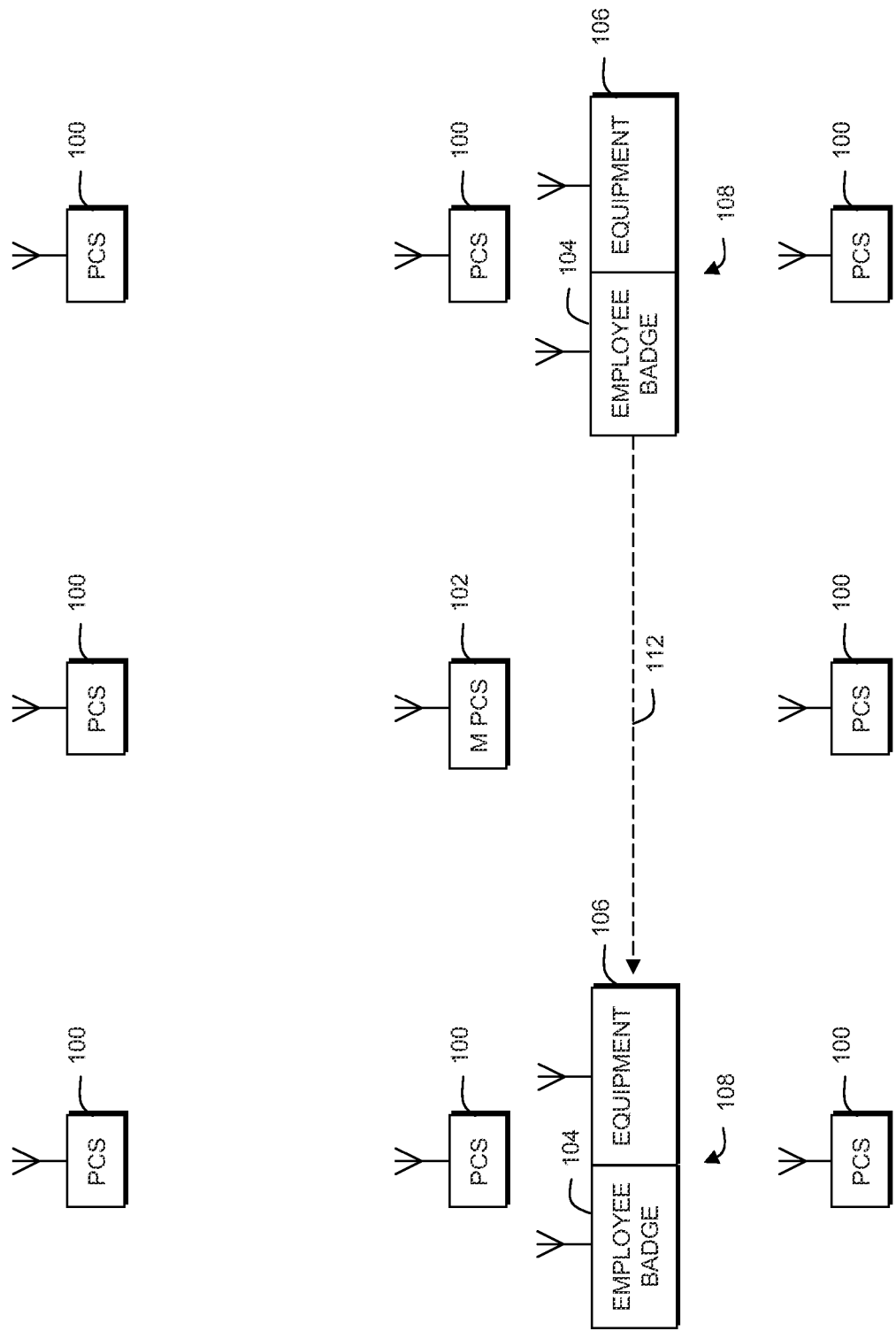
FIG. 2 is a simplified block diagram of an ad-hoc communication network system, in accordance with another embodiment of the present invention.

Referring to FIG. 2, in another embodiment, the present invention can use the price checking station network to pair a piece of equipment 106 with an employee (badge). For example, an employee can pick up a piece of equipment 106 and can use a price checking station 100 to scan their employee badge 104 and a barcode/RFID tag on the equipment 106. This will define information of the employee/equipment pair 108 that can be reported and logged in the master station 102 or central server, and can be tracked by the ad-hoc network as the pair 108 moves 112 through the store. Alternatively, the equipment 106 can be a scanning device itself. In this case, the scanning device can be used to scan the employee's badge 104, and the information of the scanning device/employee badge pair 108 can be wirelessly reported to the master station 102 or central server to be logged in. Optionally, the pairing information can be reported through any intermediate station 100 to the master station 102 or central server. The pair 108 can then be tracked by the ad-hoc network as the pair 108 moves 112 through the store. The log provides a live repository of the paired information. The master station 102 (or central server) will then be able to track which equipment is or is not paired with a certain employee, and also to which price checking station 100 each pair 108 is currently communicating. This provides equipment loss-prevention functionality, which could consist of noting that a certain equipment traveled past one or more price checking station without being paired with an employee (badge). At that point, the equipment 106 or even the price checking station could be used to remind the employee to scan his badge to re-pair with the equipment 106, and could potentially alert a store manager or trigger a camera to capture image data in response to the incident. In another embodiment, the employee could present their credentials in the form of a badge, password, pin code or a combination of the two for two factor authentication, subsequently scanning the device that the employee wishes to use. As a security measure, the system will check the credentials provided by the employee and then enable the device through remote commands from the server. These remote commands would enable the device to operate and be configured specifically for the user's needs, access levels and security access.

The equipment 106 could also consist of a mobile computing device. In this case, the master station 102 (or central server) could be responsible for managing log information that includes a table that associates specific employee (badges) to specific mobile computers in a pair 108. For example, when an employee takes any mobile computing device from its charging cradle in a store room, the employee would scan the device's barcode, as well as his own badge at any price checking station 100, which would then inform the master station 102 of this employee-device pairing, which the master would, in turn, add to its table or log of associated employee-device pairs. In another such embodiment, the employee may pick up a badge that is electronic and not specifically assigned to them. This shared resource, reusable device would then be paired at the price checker station through a two factor authentication such as a log in and an optional finger print or voice print device that could be an accessory attached or included in the price checker unit. Once user authentication is established and the device is paired appropriately, the system will communicate relevant information directly to the user.

Figure 3:
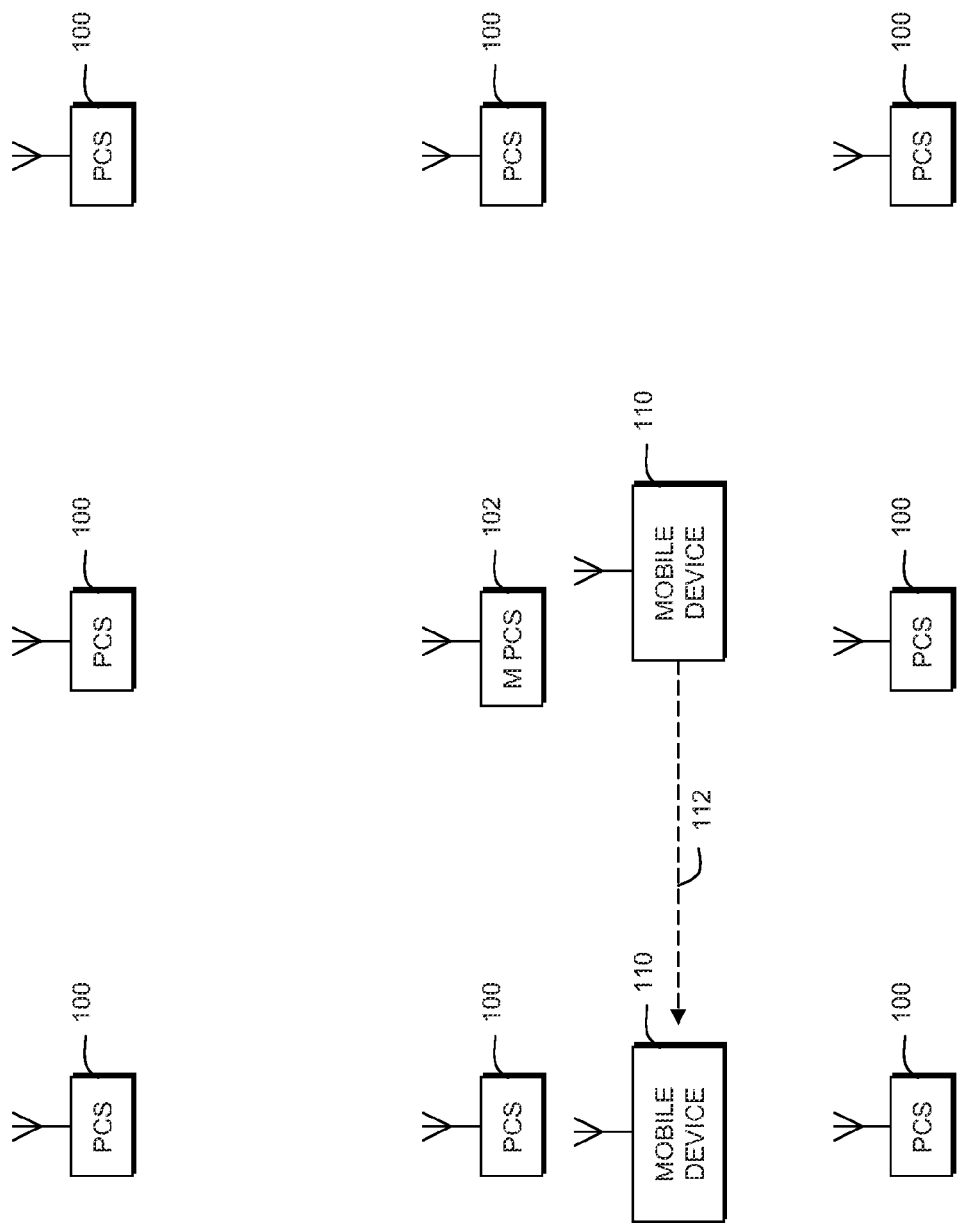
FIG. 3 is a simplified block diagram of an ad-hoc communication network system, in accordance with yet another embodiment of the present invention.

Referring to FIG. 3, in another embodiment the master station 102 could continually keep track of mobile devices 110 (e.g. wireless communication devices, two-way radios, or mobile computers) that are wirelessly connected to particular price checking stations, which are used as a wireless access points in access point subnets. The master station 102 could track the device 110 as it moves 112 through the store, for example by using a "traceroute" operation. The tracking information is stored in the master station 102, and could be provided to all slave stations 100 in the network. This tracking information could then be used by any mobile device 110 in the store (including the price checking station itself) to only call mobile devices 110 of employees that are located closest or close by, e.g. within their own access point subnet. Alternatively, if a map is available to the master station that pinpoints price checker access points to specific store locations, the operation could be refined to locate a closest mobile device. If there is no mobile device within the local price checking station subnets, then the operation could be continually expanded to call employees in proximal price checker access point subnets that are increasingly further away from the price checker access point from which the call originated.

Similarly, once the master station maintains a list of devices and their locations, it might also maintain a list of jobs that are location-specific. When a mobile device 110 enters a certain access point area, the master station 102 can send that mobile device 110 a message alerting the employee with that mobile device of the need to perform that job in that vicinity. The master station can also track the 802.11 (WLAN) channels that the various mobile devices are using and send commands to specific mobile devices to use alternate channels to better distribute the devices' use of the available WLAN spectrum.

In all of the above scenarios, the master station preferably stores a record of employee-device pairs which can be distributed amongst the stations. As each station caches or deletes a pair locally, it can notify the master station which up-dates its record and notifies the other slave station of the same. Preferably, when the master station leaves the network, such as when being occupied with its main price checking function or being turned off, the ad hoc network will designate a new master station, as previously described above. Inasmuch as the new master station has the same record as the old master station, the ad-hoc network can continue uninterrupted. Alternatively, the master station, on leaving the network, transfers its master station data to a newly designated master station, that it or the network designates, again allowing continuous network management.

Figure 4:
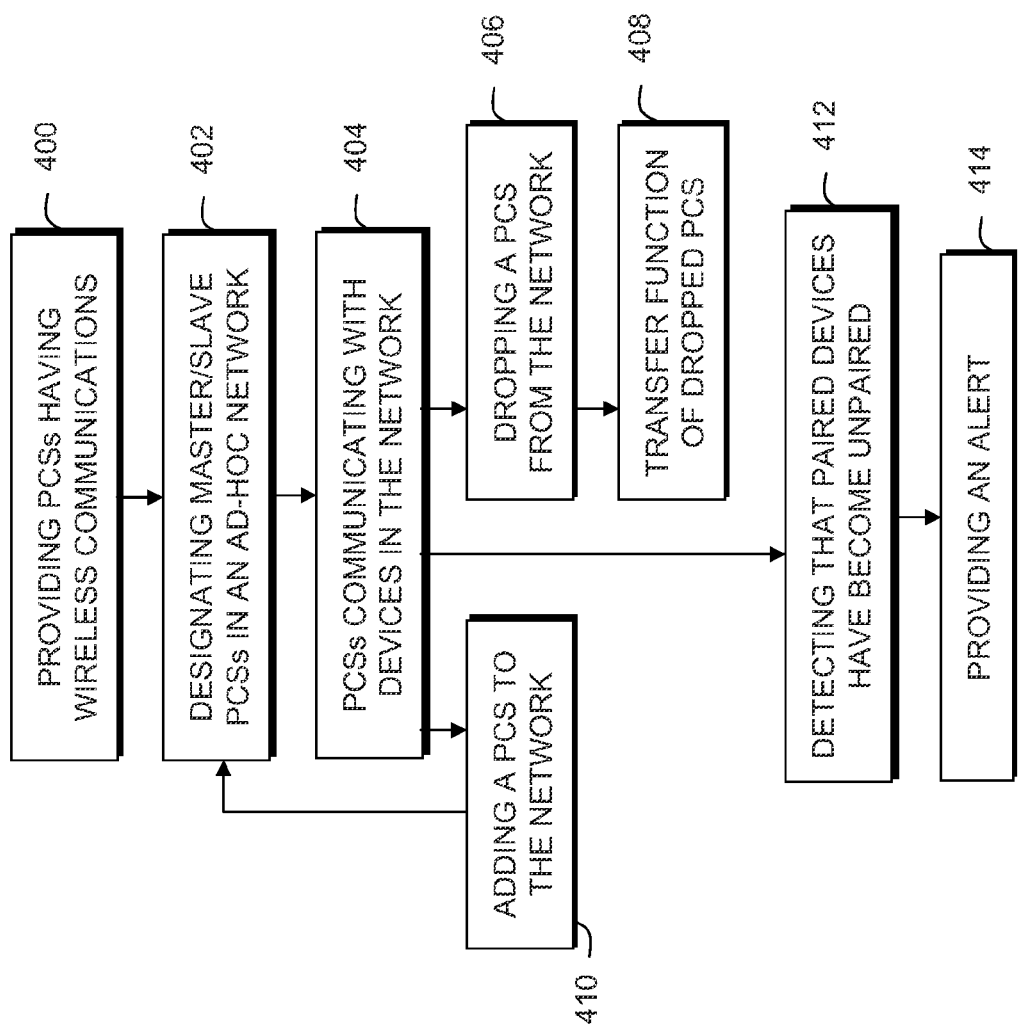
FIG. 4 is a flowchart of a method, in accordance with the present invention.

FIG. 4 illustrates a flowchart of a method for operating an ad-hoc wireless communication network, in accordance with the present invention. The method includes providing 400 a plurality of price checking stations (PCSs) having wireless communication capabilities.

The method includes designating 402 one of the price checking stations as a master station in the ad-hoc network, and designating the remaining stations as slave stations.

The method includes communicating 404 with devices deployed in the network using the wireless communications capabilities of the price checking stations.

The method further includes dropping 406 a price checking station from the network, and transferring 408 a network function of the dropped price checking station to another price checking station. The method can further include automatically adding 410 a price checking station to the network, wherein the added station can then be designated 402 as a master/slave at the next opportunity.

The network function described above can include being a master station of the ad-hoc network, communicating with devices 104-110 in the network, and tracking devices 104-110 in the network. For example, if a station is tracking a device and that station disconnects from the network for any reason, the tracking function of that station is transferred to a price checking station in proximity to the device being tracked, wherein the station transferred to can then track the device.

In one embodiment, communicating 404 includes logging an employee badge into the network and logging equipment checked-out to the employee badge into the network to define an employee-equipment pair. In this way, communicating 404 can further include tracking the employee-equipment pair. Optionally, communicating can further include maintaining a log of employee-equipment pairs in the master station, and providing the log to the slave stations. In this way, if a price checking station detects 412 either one, but not both, of the paired employee-equipment in the log, the price checking station providing an alert 414. In other words, if paired devices have become unpaired, an alert is provided.

In another embodiment, communicating 404 includes tracking locations of mobile communication devices, and wherein communicating further includes using the tracking information to call a closest-located mobile communication device. A closest-location of a mobile communication device can be refined using an available map of price checking station locations. Additionally, if there is no mobile communication device within a local price checking station subnet, then locating a close-by mobile communication device is expanded to call proximal price checking station access point subnets that are increasingly further away from the price checker access point from which the call originated.

Another embodiment includes maintaining a list of jobs that are location specific, and communicating 404 includes detecting that a mobile device has entered a location where there is a job to be accomplished and sending a message to the mobile device indicating the job to be accomplished in that location.

Advantageously, the present invention provides price checking stations with wireless communication capabilities to form an ad-hoc communication network that includes load-sharing and failover mechanisms. In this way, the present invention provides a virtual server, where there was no access to a server before. Further, the additional computing bandwidth of the price checking stations can be used to continually gather information about mobile devices that are deployed in the network environment by using their wireless communications technologies (i.e. WLAN).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for operating an ad-hoc wireless communication network, the method comprising: providing a plurality of price checking stations having wireless communication capabilities, the price checking stations being connected in an ad-hoc wireless communication network; designating one of the price checking stations as a master station in the ad-hoc network, and designating the remaining stations as slave stations; communicating with the master station about devices deployed in the network using the wireless communications capabilities of the price checking stations; informing the ad-hoc network that the master price checking station is leaving the network as the master station to instead perform a price checking function; dropping the master price checking station from the network; and transferring the master function of the dropped price checking station to another price checking station.

2. The method of claim 1, wherein the master station of the ad-hoc network is the price checking station having the highest wireless signal strength.

3. The method of claim 1, wherein communicating includes logging an employee badge into the master station using a price checking station and logging equipment checked-out to the employee badge into the master station using a price checking station to define an employee-equipment pair.

4. The method of claim 3, wherein communicating further includes tracking the employee-equipment pair.

5. The method of claim 3, wherein communicating further includes maintaining a log of employee-equipment pairs in the master station, and providing the log to the slave stations.

6. The method of claim 5, wherein if a price checking station detects either one, but not both, of the paired employee-equipment in the log, providing an alert.

7. The method of claim 5, further comprising deleting an employee-equipment pair at a slave station, which reports the deletion to the master station, which up-dates its log of pairs and notifies the other slave station of the same.

8. The method of claim 1, wherein communicating includes tracking locations of mobile communication devices that are wirelessly connected to particular price checking stations that are used as wireless access points in access point subnets, the tracking information provided to all slave stations in the network, and wherein communicating includes using the tracking information to call a closest-located mobile communication device within a callers own access point subnet.

9. The method of claim 8, wherein a closest-location of a mobile communication device can be refined using an available map of price checking station locations.

10. The method of claim 9, wherein if there is no mobile communication device within a local price checking station subnet, then locating a close-by mobile communication device is expanded to call proximal price checking station access point subnets that are increasingly further away from the price checker access point from which the call originated.

11. A price checking station having wireless communication capabilities operable on an ad-hoc wireless communication network consisting of a plurality of price checking stations, the price checking station comprising:
  a scanner;
  a wireless transceiver operable on the network;
  a processor coupled to, and operable to control, the transceiver and scanner, wherein the processor is operable to communicate with the plurality of price checking stations to designate one of the price checking stations as a master station in the ad-hoc network, and designate the remaining stations as slave stations, and communicate with the master station about devices deployed in the network using the wireless transceiver; wherein the ad-hoc network is informed that the master price checking station is leaving the network as the master station to instead perform a price checking function; dropping the master price checking station from the network; and transferring the master function of the dropped price checking station to another price checking station.

* * * * *